3,767,708
AMINOMETHYL PHOSPHOLENES
Curtis P. Smith, Cheshire, and Henri Ulrich, North Branford, Conn., assignors to The Upjohn Company, Kalamazoo, Mich.
No Drawing. Filed Oct. 18, 1971, Ser. No. 190,374
Int. Cl. C07f 9/28
U.S. Cl. 260—563 R     7 Claims

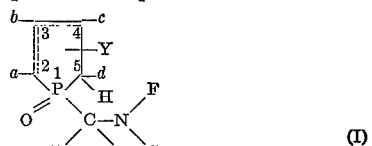

ABSTRACT OF THE DISCLOSURE

Compounds are disclosed having the general formula:

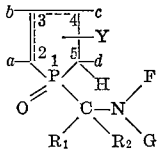

wherein $a$, $b$, $c$ and $d$ are each selected from the group consisting of hydrogen, halogen, alkoxy of 1 to 6 carbon atoms, inclusive, phenoxy, hydrocarbyl of 1 to 6 carbon atoms, inclusive and halo-substituted hydrocarbyl of 1 to 6 carbon atoms, inclusive; F is selected from the group consisting of hydrogen, alkyl of 1 to 6 carbon atoms, inclusive, and hydroxyalkyl of 2 to 6 carbon atoms, inclusive; G is hydroxyalkyl of 2 to 6 carbon atoms, inclusive; $R_1$ and $R_2$ when taken individually are each selected from the group consisting of hydrogen, hydrocarbyl of 1 to 6 carbon atoms; $R_1$ and $R_2$ taken together with the carbon atom to which they are attached, represent a moiety selected from the group consisting of cycloalkylene and cycloalkenylene, said cycloalkylene and cycloalkenylene each having 4 to 6 carbon atoms, inclusive in the ring thereof; the broken line indicates a double bond located between the carbon atom at position 3 and one of the two carbon atoms at positions 2 and 4; Y is hydrogen attached to whichever carbon atom at positions 2 and 4 is not part of said double bond. Disclosed also are novel intermediate compounds and methods of employing them in preparing the novel compounds of the invention.

The compounds of the invention are useful as catalysts for preparing carbodiimides from isocyanates; as surface-active agents and as reactive flame retardant components of polymer systems, such as polyurethane polymers.

BACKGROUND OF THE INVENTION

(1) Field of the invention

The invention relates to novel heterocyclic phosphorus compounds, and is more particularly concerned with novel 1 - alkanolaminomethylphospholene - 1 - oxides and with methods of their preparation.

(2) Detailed description of the prior art

Prior hereto, aliphatic dialkyl dialkanolaminoalkylphosphonates were known; see for example U.S. Pat. 3,076,010. Similarly, the bis(hydroxypolyalkoxyalkyl)-aminomethylphosphonates have been described (U.S. Pat. 3,457,333).

Also known prior hereto are 1-alkyl-, 1-aryl-, 1-alkoxy-, 1-aryloxy-, and 1-N,N-dialkylaminophospholene-1-oxides and 1-sulphides; see for example U.S. Pat. 3,345,287.

The trivalent 1-alkyl- and 1-aryl-phospholenes have also been described previously; see for example Quin et al., J. Org. Chem., 33, 1034–41.

Subsequent to our invention, the preparation of 1-hydrophospholene-1-oxides was described by Myers et al., J. Org. Chem., 36, 1285–90, (1971).

SUMMARY OF THE INVENTION

The invention comprises a compound of the formula:

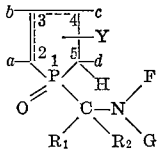         (I)

wherein $a$, $b$, $c$ and $d$ are each selected from the group consisting of hydrogen, halogen, alkoxy of 1 to 6 carbon atoms, inclusive, phenoxy, hydrocarbyl of 1 to 6 carbon atoms, inclusive and halo-substituted hydrocarbyl of 1 to 6 carbon atoms, inclusive; F is selected from the group consisting of hydrogen, alkyl of 1 to 6 carbon atoms, inclusive and hydroxyalkyl of 2 to 6 carbon atoms, inclusive; G is hydroxyalkyl of 2 to 6 carbon atoms, inclusive; $R_1$ and $R_2$ when taken individually are each selected from the group consisting of hydrogen, and hydrocarbyl of 1 to 6 carbon atoms; $R_1$ and $R_2$ taken together with the carbon atom to which they are attached, represent a moiety selected from the group consisting of cycloalkylene and cycloalkenylene said cycloalkylene and cycloalkenylene each having 4 to 6 carbon atoms, inclusive, in the ring thereof; the broken line indicates a double bond located between the carbon atom at position 3 and one of the two carbon atoms at positions 2 and 4; Y is hydrogen attached to whichever carbon atom at positions 2 and 4 is not part of said double bond.

One skilled in the art will appreciate that the Compounds I can exist in both cis and trans stereoisomer forms. It is to be understood therefore, that the Formula I is intended to encompass such cis and trans forms and mixtures thereof.

The invention also comprises methods of preparing and using the Compounds I and novel intermediate compounds employed in preparing the Compounds I.

The term "halogen" is used throughout this specification and claims in its generally accepted sense as embracing chlorine, bromine, iodine, and fluorine.

The term "hydrocarbyl of 1 to 6 carbon atoms, inclusive" as used throughout the specification and claims means the monovalent radical obtained by removing one hydrogen atom from a parent hydrocarbon of the stated carbon content. Illustrative of such hydrocarbyl groups are alkyl of 1 to 6 carbon atoms, inclusive such as methyl, ethyl, propyl, butyl, pentyl, hexyl, and the isomeric forms thereof; alkenyl of 2 to 6 carbon atoms, inclusive, such as vinyl, allyl, butenyl, pentenyl, hexenyl, and isomeric forms thereof; and phenyl.

The term "halo-substituted hydrocarbyl of 1 to 6 carbon atoms, inclusive" means hydrocarbyl as above defined wherein from one to all of the hydrogen atoms in said hydrocarbyl radical have been replaced by halogen. Illustrative of halo-substituted hydrocarbyl groups are chloromethyl, trichloromethyl, trifluoromethyl, 2-chloroethyl, 2,3-dichlorobutyl, 2-chlorobutenyl, 2-bromohexyl, 4-chlorophenyl, 3-fluorophenyl, 2-chloropropenyl, and the like.

The term "alkoxy" means the monovalent radical of formula —O—E wherein E is alkyl as defined above. Illustrative of alkoxy are groups such as methoxy, ethoxy, propoxy, butoxy pentyloxy, hexyloxy and isomeric forms thereof.

The term "hydroxyalkyl of 2 to 6 carbon atoms, inclusive" means alkyl as defined above having 2 to 6 carbon atoms, inclusive, and wherein a hydrogen atom has been replaced by a hydroxyl group. Illustrative of hydroxyalkyl groups of 2 to 6 carbon atoms, inclusive, are hydroxyethyl, hydroxypropyl, hydroxybutyl, hydroxypentyl, hydroxyhexyl, and isomeric forms thereof.

The term "cycloalkylene and cycloalkenylene, said cycloalkylene and cycloalkenylene each having 4 to 6 carbon atoms, inclusive, in the ring thereof" as used herein means that divalent moiety obtained upon removal of two hydrogen atoms from a cycloalkane and a cycloalkene, respectively, each having the stated ring carbon content and wherein the resulting divalencies occur on a single ring carbon thereof. Illustrative of such cycloalkylene moieties are 1,1-cyclobutylene, 1,1-cyclopentylene, 1,1-cyclohexylene, and the like. Illustrative of such cycloalkenylene moieties are 1,1-cyclobutenylene, 1,1-cyclopentenylene, 1,1-cyclohexenylene, and the like.

The Compounds I are useful for a variety of purposes. For example, they can be employed as catalysts for preparing carbodiimides from isocyanates. Methods of preparing carbodiimides from isocyanates by catalytic reaction are well known; see for example Monagle et al., J. Am. Chem. Soc. 84, 4288–9.

The Compounds I possess surface active properties which make them useful as detergents, dispersing agents, wetting agents, and the like.

In addition, the Compounds I can be chemically incorporated as flame retardant components of polymer systems. For example, the Compounds I can be incorporated into polyester polymers, following the procedure of U.S. Pat. 2,913,436 to obtain fire retardant coatings, varnishes and like useful materials.

The Compounds I, by virtue of the double bond can also be incorporated into polyolefin polymer systems by copolymerization with the starting monomeric components of the system. General methods of carrying out such copolymerizations are well known, as illustrated by the method of U.S. Pat. 3,299,015. Thus, for example, there are obtained polyethylene and polypropylene polymers having flame retardant properties.

The novel Compounds I are particularly valuable when used alone or in admixture with other known polyols to prepare fire retardant polyurethane polymers by reaction with organic polyisocyanates. Methods of preparing fire retardant polyurethane polymers from phosphorus containing polyols are well known; see for example Dombrow, "Polyurethanes," Reinhold Publishing Co., New York, N.Y., pp. 1–105, (1957) and Saunders et al., "Polyurethanes: Chemistry and Technology," Part I, Interscience Pub., New York, N.Y. (1962).

Although all compounds of Formula I are useful as described above, those compounds having particularly valuable properties are those within the scope of Formula I and wherein $a$, $c$ and $d$ are each hydrogen; $b$ is methyl; F is selected from the group consisting of hydrogen and hydroxyalkyl of 2 to 3 carbon atoms, inclusive; $R_1$ and $R_2$ when taken individually are selected from the group consisting of hydrogen and alkyl of 1 to 6 carbon atoms, inclusive; and $R_1$ and $R_2$ when taken together with the carbon atom to which they are attached represent cycloalkylene of 6 carbon atoms.

DETAILED DESCRIPTION OF THE INVENTION

The novel Compounds 1 of the invention are derivatives of phospholene, and named accordingly. The system of nomenclature employed throughout the specification and claims is illustrated by the following examples:

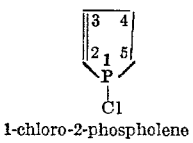
1-chloro-2-phospholene

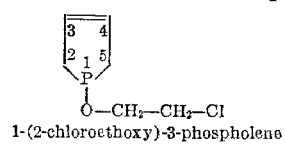
1-(2-chloroethoxy)-3-phospholene

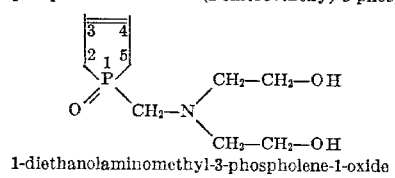
1-diethanolaminomethyl-3-phospholene-1-oxide

The compounds of the invention I are conveniently prepared by reacting the appropriate phospholene Compound II with the appropriate alaknolamine III and an appropriate carbonyl Compound IV. The reaction is carried out under Mannich reaction conditions, and is conveniently illustrated by the schematic equation:

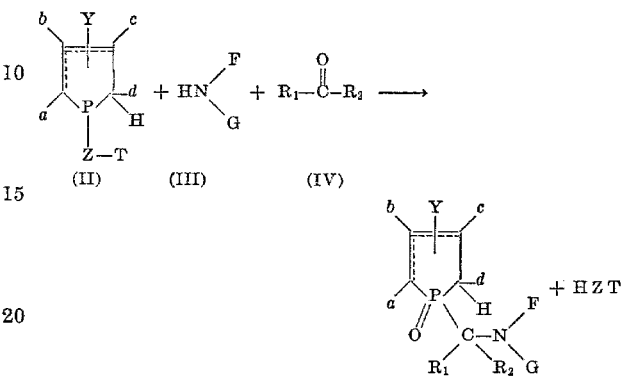

wherein $a$, $b$, $c$, $d$, F, G, $R_1$, $R_2$, Y and the broken line have the significance hereinbefore attributed to them; Z represents oxygen and sulfur; and T is selected from the group consisting of hydrocarbyl and halo-substituted hydrocarbyl; said hydrocarbyl having 1 to 12 carbon atoms, inclusive.

The process of the invention is carried out by bringing together substantially equimolar proportions of the reactants (II), (III), and (IV). The reaction conditions employed are those of the well known Mannich reaction; see for example "Organic Reactions," Adams, vol. 1, pp. 303–30, Wiley, New York, N.Y. (1942); α-aminoalkylierung, Hellman and Opitz, Verlag Chemie, GmbH, pp. 79–83 (1960); and Fields, J.A.C.S., 74, 1528–31.

Preferably, the carbonyl reactant (IV) and the alkanolamine (III) are brought together first in any convenient manner and the phospholene reactant (II) slowly added to the resulting mixture. The resulting reaction is generally exothermic. The rate of addition of reactant (II) to the mixture of (III) and (IV) is preferably controlled so that the temperature of the reaction mixture does not exceed about 120° C. during addition.

If desired the above reactants can be brought together in the presence of an inert liquid diluent, i.e. a diluent which does not enter into or in any way interfere with the reaction taking place. Examples of inert diluents for the above reaction are aliphatic alcohols such as methanol, ethanol isopropyl alcohol, butanol, sec.-butyl alcohol, hexanol, octanol, dodecanol, and the like; aromatic diluents such as benzene, toluene, naphthalene, xylene and the like. As will be obvious to one skilled in the art, the choice of diluent for any particular reaction will depend upon a number of factors, the chief of which will be the desired reaction temperature.

The temperature of the reaction mixture is advantageously maintained within the range of about 40° C. to about 100° C. until the admixture of the three reactants is complete. Thereafter the reaction mixture is preferably heated to a temperature within the range of about 50° C. to about 110° C.

In general, the reaction proceeds rapidly when the carbonyl reactant (IV) is an aldehyde. When carbonyl reactant (IV) is an aldehyde, the reaction following admixture of all three reactants, proceeds most advantageously at a temperature of from about 50° C. to about 60° C. until the reaction is complete. When the carbonyl reactant (IV) is a ketone, the reaction generally proceeds at a relatively slower rate. The reaction is promoted by heating the reaction mixture containing all three reactants. It is preferred that the reaction be carried out at a temperature of about 70° C. to about 110° C. when the carbonyl reactant (IV) is a ketone.

The progress of the reaction can be followed by any one or more conventional analytical techniques such as infra-red spectral analysis, nuclear magnetic resonance analysis and like techniques which will show the disappearance of carbonyl reactant (IV) and the formation of the product Compounds I.

When the desired end-point has been reached, the reaction mixture is stripped of diluent, if any, together with volatile by-products using conventional techniques such as evaporation, distillation and like techniques. The product Compounds I are then conveniently separated from the reaction mixture residue by conventional methods such as distillation, chromatographic separation, countercurrent extraction and like methods.

The alkanolamine (III) reactants employed in preparing product Compounds I are for the most part well known compounds as is their preparation; see for example E. H. Rodd, Chem. of Carbon Compounds, Elsevier Pub. Company, New York, N.Y., (1951), vol. I, pps. 689–694. Representative of alkanolamine Compounds III are ethanolamine, isopropanolamine, methylethanolamine, diethanolamine, bis(2-hydroxypropyl)amine, 1-N-(2-hydroxyethyl) - N-(2-hydroxypropyl)amine, diisobutanolamine, dipentanolamine, hexanolamine and the like.

The carbonyl Compounds IV employed as reactants in the process of preparing Compounds I are aldehydes or ketones. They are, for the most part, well known compounds as is their preparation; see for example E. H. Rodd, supra, vol. I, Chapter 8. Illustrative of the carbonyl Compounds IV are formaldehyde, acetaldehyde, propionaldehyde, n-butyraldehyde, n-valeraldehyde, caproaldehyde, n-heptaldehyde, acrolein, methacrolein, crotonaldehyde, 2-heptenal, benzaldehyde, acetone, methyl ethyl ketone, methyl isobutyl ketone, ethyl dodecyl ketone, diethyl ketone, diisobutyl ketone, allyl vinyl ketone, mesityl oxide, acetophenone, benzophenone, cyclobutanone, cyclopentanone, cyclohexanone, 2-cyclobutenone, 2-cyclopentenone, 2-cyclohexenone, and the like.

Preferred as the carbonyl reactant (IV) in the process of the invention is formaldehyde. Formaldehyde can be added to the reaction mixture in any of the forms in which it is conventionally made available, such as an aqueous solution thereof (formalin) or as paraformaldehyde. The preferred form of formaldehyde employed in the process of the invention is paraformaldehyde.

The phosphorene reactants (II) employed in preparing the Compounds I are novel compounds, and are valuable for a number of purposes as demonstrated herein by their use in the synthesis of the novel Compounds I. In addition, the Compounds II are useful catalysts for preparing carbodiimides from isocyanates following the procedure for example, of Monagle et al., supra.

The starting Compounds II can be prepared by a variety of methods. For example, they are conveniently prepared by reacting equimolar proportions of the corresponding 1-halophospholene (V) and an appropriate mercaptan or hydroxyl containing Compound VI. The reaction is illustrated by the schematic equation:

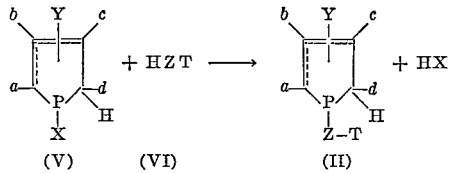

wherein a, b, c, d, Y, Z, T and the broken line have the significance hereinbefore assigned to them; and X is halogen.

The above illustrated reaction is carried out by admixture of the reactants (V) and (VI) using conventional apparatus.

Procedural details for preparing Compounds II can be the same as described by Hasserodt et al., Tetrahedron, vol. 19, pp. 1563– (1963) for the preparation of 1-alkoxyphospholene-1-oxides, except that sources of oxygen, such as air, are excluded from contact with the reaction mixture. This is accomplished by conventional methods, such as by carrying out the process under an inert gas atmosphere. Illustrative of inert gases are nitrogen and the like.

When the by-product of the reaction is a halogen acid, i.e.: hydrogen chloride, hydrogen bromide and the like, it is preferred that such acid be removed from the reaction mixture as it is formed. This can be accomplished by known and conventional techniques. For example, a tertiary amine acid acceptor can be added to the reaction mixture to form a complex with the halogen acid as it forms.

The reaction can be carried out over a broad range of temperatures, i.e.: from about −70° C. to about 25° C.

Advantageously, the preparation of Compounds II is carried out in the presence of an inert organic solvent. The quantity of solvent employed is not critical. Preferably the solvent is employed to provide a starting reaction mixture having a 0.1 to 5.0 molar concentration of halophospholene Compound V.

Inert organic solvents are organic solvents which do not enter into or in any way interfere with the desired course of the reaction. Examples of inert organic solvents which can be employed in the preparation of the Compounds II as described above are aliphatic hydrocarbon solvents such as n-hexane cyclohexane and the like; aromatic solvents such as benzene, toluene, xylene, tetrahydrofuran and the like; chlorinated hydrocarbons such as methylene chloride, chloroform, carbon tetrachloride, 1,2-dichloroethane, chlorobenzene and the like.

Progress of the above reaction can be followed by conventional analytical techniques, such as nuclear magnetic resonance analysis which will show appearance of absorption spectra characteristic of the product Compounds II. Upon completion of the reaction, the Compounds II are readily separated from the reaction mixture by conventional methods such as, for example, distillation, countercurrent extraction and like methods.

The 1-halophospholene Compounds V are for the most part known compounds. They can be prepared by the method of Myers et al., supra. Alternatively, the 1-halophospholenes (V) can be prepared by the method of our copending application, Ser. No. 148,997, filed June 1, 1971.

The latter method includes the preparation of mixtures of halophospholene Compounds V and crude mixtures of Compounds V containing a number of impurities, from the corresponding mixtures of conjugated dienes. For example, in the commercial cracking of gas oil there are obtained crude mixtures of conjugated dienes with proportions of non-conjugated dienes and other hydrocarbons. These crude mixtures are converted by the process disclosed in our copending application to corresponding crude mixtures containing substantial proportions of the 1-halophospholene Compounds V; which can then be employed in the above described method to prepare corresponding crude mixtures of intermediate Compounds II. Similarly, the crude mixtures of intermediate compounds II so obtained can be used without further treatment to prepare corresponding crude mixtures of the novel Compounds I by the method previously set forth. For a number of purposes, the crude mixtures of Compounds I so obtained can be employed without further treatment or purification. For example, as fire retardant components of polyurethane polymer foam systems, the entire crude composition containing Compounds I can be used.

Reactant Compounds VI employed in preparing Compounds II are generally well known as is their preparation. Those compounds of Formula VI wherein Z represents sulfur are illustrated by thiols, which can be prepared by the methods described in Rodd, supra, vol. 1, pp. 345–47. Examples of such thiols are methanethiol, ethanethiol, isopropanethiol, isobutanethiol, isopentanethiol, isohexanethiol, isoheptanethiol, octanethiol, nonanethiol, decanethiol, undecanethiol, dodecanethiol, allylthiol, 1-dodecenethiol, benzenethiol, xylenethiol, 2-naphthalenethiol, 4 - biphenylthiol, benzylthiol, 2-biphenylthiol, 3 - chloropropanethiol, 4-bromobutanethiol and the like.

Compounds of the Formula VI wherein Z represents oxygen are hydroxy compounds. Illustrative of such compounds are aliphatic alcohols such as methanol, ethanol, propanol, butanol, pentanol, hexanol, heptanol, octanol, nonyl alcohol, N-decyl alcohol, N-undecyl alcohol, lauryl alcohol, 2-butenol, 1-octenol, 2-dodecenol, 2-chloroallyl alcohol, ethylene chlorohydrin propylene chlorohydrin and isomeric forms thereof; aromatic hydroxy compounds such as phenol, naphthol xylol, p-phenylphenol and the like; aralkyl alcohols, such as benzyl alcohol, 1-phenyl-2-methyl-2-propanol, 2-phenyl-2-hexanol and the like.

Alternatively, the alkali metal salts of the Compounds VI such as sodium ethoxide, potassium ethoxide, sodium phenate and the like can be substituted for the thiol or the alcohol Compound VI in preparing the intermediates Compounds II.

Preferred intermediate Compounds II employed in the preparation of the novel Compounds I are those wherein the symbol T as used in the Formula II specifically represents monohalo-substituted alkyl of 2 to 8 carbon atoms, inclusive. An alternate and preferred method of preparing these preferred intermediate compounds of Formula II comprises reacting equimolar proportions of the corresponding 1 - halophospholene (V) with an appropriate alkylene oxide or alkylene sulphide. Using 1-chloro-3-phospholene as an example of 1-halophospholene compounds of the Formula V and ethylene oxide as an example of the co-reactant, the reaction is illustrated by the schematic equation:

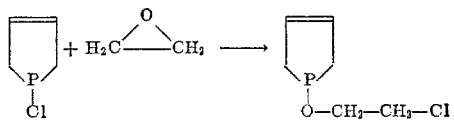

The above illustrated reaction is carried out by the admixture of reactants in an inert organic solvent as previously defined. The solvent is employed in a quantity such that the concentration of alkylene oxide or sulphide in the initial reaction mixture is from about 0.5 molar percent to about 20.0 molar percent.

The reaction described immediately above proceeds satisfactorily under a broad range of temperature conditions i.e.: from about —70°C. to reflux temperature. It is advantageous however, to carry out the reaction at a temperature below the boiling point of the alkylene oxide or alkylene sulphide reactant. Preferably the reaction is carried out under an inert gas atmosphere, such as for example under a nitrogen gas atmosphere.

Progress of the above reaction can be followed by conventional analytical techniques, such as infra-red spectral analysis which will show absorption spectra characteristic of the preferred product compounds of the Formula II. Upon completion of the reaction, the desired preferred compounds of Formula II are separated from the reaction mixture by conventional methods such as, for example, distillation, chromatographic separation and the like.

Mixtures and crude mixtures of the 1-halophospholene (V) as previously described can be reacted with the alkylene oxides or sulphides in accordance with the above described reaction scheme to obtain corresponding mixtures and crude mixtures of the preferred intermediate compounds within Formula II.

A preferred embodiment of the process of the invention comprises the continuous or semi-continuous production of the novel product Compounds I, starting with the 1-halophospholene Compounds V and proceeding through the preferred intermediate Compounds II; said preferred intermediate Compounds II being obtained by the previously described reaction of an alkylene oxide or alkylene sulphide with a 1-halophospholene (V).

The alkylene oxides and alkylene sulphides employed to prepare the preferred compounds of Formula II are well known as is their preparation. Representative of such alkylene oxides are ethylene oxide, 1,2-butylene oxide, 1,2-pentylene oxide, 2,3-hexylene oxide, 2,3-heptylene oxide, 1,2-octylene oxide, and the like.

Alkylene sulphides can be prepared according to the method of W. Davies et al., J. Chem. Soc. (1946), p. 1050. In general, the method is carried out by reaction of the corresponding alkylene oxide with potassium thiocyanate. Representative of known alkylene sulphides are ethylene sulphide, propylene sulphide, isobutylene sulphide, and the like.

An alternate process for preparing the novel Compounds I comprises substituting an equimolar proportion of a 1-hydrophospholene-1-oxide of formula:

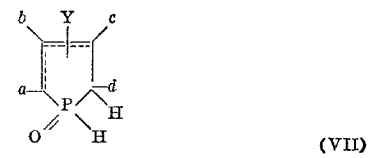

(VII)

wherein $a$, $b$, $c$, $d$, Y and the broken line are as before defined, for the corresponding starting Compound II in the previously described Mannich type reaction.

The hydrophospholene oxide (VII) can be prepared by reacting the 1-halophospholene (V) with water, in the presence of concentrated hydrochloric acid, following the method of Myers et al., supra.

A preferred method of preparing 1-hydrophospholene-1-oxides as illustrated by compounds of the Formula VII comprises admixing (i) substantially equimolar proportions of the corresponding 1-halophospholene, as illustrated by 1-halophospholene compounds of the Formula V, with (ii) water, and removing from the resulting mixture, halogen acid by-product of the resulting reaction, as said acid forms in the reaction mixture. The preferred method of preparing 1-hydrophospholene-1-oxides has a number of advantages. For example, the crude reaction mixture containing product Compounds VII is substantially free of acid. In a continuous process, the acid free crude product mixture can be employed without first separating the hydrophospholene oxide Compounds VII, to prepare the corresponding novel Compounds I, by the previously described Mannich type reaction. The obviating of an additional separation step results in a more efficient process and higher overall yields.

The above described preferred process of preparing 1-hydrophospholene-1-oxides results in an exothermic reaction. The exotherm is conveniently controlled by cooling the reaction mixture, and by the slow addition of the water reactant to the halophospholene (V). It is preferred that the temperature of the reaction mixture range between about —20° C., to reflux during the course of reaction, and most preferably between about 0° C. to 20° C.

Maintaining control of the temperature of the reaction mixture is assisted by carrying out the admixture of reactants in the presence of an inert organic solvent as previously defined. The employment of such a solvent is a preferred embodiment of the process, and preferred as inert organic solvents are aprotic solvents such as benzene. The solvent is preferably employed in a quantity sufficient to provide a starting reaction mixture having a concentration of 1-halophospholene reactant of from 0.5 to about 20 molar.

It is advantageous to prepare the hydrophospholene oxide (VII) under an inert gas atmosphere, such as for example, nitrogen gas, using conventional apparatus.

The halogen acid by-product formed during the preparation of Compounds I from the corresponding hydrophospholene oxide Compounds VII can be removed from the reaction mixture as it forms by any of the known and conventional methods. For example, any of the conventional techniques for volatilizing the halogen acid and separating it as a gas can be employed. Such techniques are generally well known.

A preferred method for removing the halogen acid by-product is by neutralization or conversion to an inert compound i.e.: one which does not enter into or in any way alter the course of the desired reaction. For example, a stoichiometric proportion of an acid acceptor compound can be added to the reaction mixture.

Examples of acid acceptors are the aliphatic tertiary amines such as trimethylamine, tripentylamine, tridodecylamine, and the like; heterocyclic amines such as pyridine, quinoline and the like.

Upon completion of the above reaction, which can be observed by conventional analytical techniques such as infra-red spectral analysis, the desired hydrophospholene oxide Compounds VII are readily separated from the reaction mixture, when such separation is desired, by conventional methods. For example they can be separated by distillation, countercurrent extraction and like methods.

The following preparations and examples describe the manner and process of making and using the invention and set forth the best mode contemplated by the inventors of carrying out the invention but are not to be construed as limiting.

PREPARATION 1

A 12 liter, 3 necked round bottom flask fitted with a means for stirring is charged with 5200 ml. of benzene and 1 lb. of white phosphorus. The air in the reaction flask is replaced with nitrogen gas, and the mixture distilled at refluxed temperature to remove water, and about 200 ml. of benzene. While maintaining the nitrogen gas atmosphere, the reaction flask is additionally charged with 44.5 gms. of copper stearate, 2782 ml. (27.82 moles) of isoprene, 1847 ml. of (2907 gms., 21.2 moles) of phosphorus trichloride, 105 ml. (299.5 gms.) of phosphorus tribromide and 11 gms. of iodine. The mixture is refluxed for about 6 hours under the nitrogen gas atmosphere while being continually stirred. At the end of the reflux period, the reaction mixture is stripped of benzene solvent and phosphorus trichloride by-product by distillation at a pressure of between 100 mm. to 760 mm. of mercury and at a temperature circa 40° C. The residue comprises a clear yellow solution containing 1-chloro-3-methyl-3-phospholene and an orange colored precipitate.

Example 1

Preparation of 1-methoxy-3-methyl-3-phospholene.—A reaction flask is charged with 25.2 gms. (0.1873 moles) of 1-chloro-3-methyl-3-phospholene (method of Myers et al., supra) and 150 ml. of n-hexane. The mixture is cooled to −70° C. and the reaction vessel flushed with nitrogen gas. While maintaining the mixture under a blanket of nitrogen gas and at a temperature of −70° C., there is added a solution of 28.0 ml. (0.20 moles) triethylamine and 9.0 ml. (0.22 moles) of methanol (previously dried over Linde 3A molecular sieves) in 50 ml. of n-hexane. The addition is accomplished over a period of 20 minutes, after which the reaction mixture is agitated briefly and then warmed to room temperature. An additional 100 ml. of n-hexane is added to the reaction mixture and the resulting mixture filtered. The filtration residue is washed with 200 ml. of n-hexane and the combined filtrate and washing stripped of solvent by distillation. The distillation residue is distilled at a temperature of 53° C. to 55° C. and under a pressure of 9.0 mm. to 12.0 mm. of mercury to give 14.9 gms. (61.3% of theory) of a distillate which is 1-methoxy-3-methyl-3-phospholene in the form of a colorless liquid, boiling point 53° C.–55° C./10 mm. of mercury.

*Analysis.*—Calc. for $C_6H_{11}OP$ (percent): C, 55.30; H, 8.40; P, 23.80. Found (percent): C, 56.13; H, 8.59; P, 21.39.

The assigned structure of the product is confirmed by nuclear magnetic resonance analysis.

Similarly, following the above procedure but replacing the methanol as used therein with an equal molar proportion of n-hexanol, lauryl alcohol, allyl alcohol, 5,9-dimethyl-8-decen-5-ol, benzyl alcohol, 6-phenyl-1-hexanol, p-chlorobenzyl alcohol and propylene chlorohydrin, respectively, there are obtained 1-hexyloxy-; 1-dodecyloxy-; 1 - allyloxy-; 1 - (1,5-dimethyl-1-butyl-4-hexenoxy)-; 1-benzyloxy-; 1-(6-phenylhexyl)oxy-; 1-p-chlorobenzyloxy-; and 1 - chloroisoproxy - 3-methyl-3-phospholene, respectively.

Example 2

Preparation of 1-isopropoxy-3-methyl-3-phospholene.—Following the procedure of Example 1 but replacing the methanol as used therein with an equal molar proportion of isopropyl alcohol, there is obtained 1-isopropoxy-3-methyl-3-phospholene in the form of a colorless liquid having a boiling point of 67° C. to 72° C./15 mm. of Hg. The assigned structure of the product is confirmed by nuclear magnetic resonance analysis.

Similarly, following the above procedure but replacing the 1-chloro-3-methyl-3-phospholene as used therein with an equal molar proportion of the following phospholenes:

1-chloro-;
1,3-dichloro-;
1-chloro-2,3,4,5-tetrabromo-;
1-chloro-3,4-dibutyl-;
1-chloro-3,(4-chloro-4-methylpentyl)-;
1-chloro-2,3,5-triphenyl-;
1-chloro-2-o-chlorophenyl-5-phenyl-;
1-chloro-5-vinyl-;
1-chloro-4-(4-methyl-3-pentyl)-;
1-chloro-5-phenoxy-;
1-chloro-3-methoxy-; and
1-chloro-2-isohexyloxy-3-phospholene, respectively; and the corresponding 2-phospholene isomers (all of which are prepared by reaction of the corresponding conjugated diene with phosphorus trichloride, following the method of Preparation 1, and separating the desired phospholenes from the crude product mixture so obtained, by distillation) there is obtained the corresponding:

1-isopropoxy-;
1-isopropoxy-3-chloro-;
1-isopropoxy-2,3,4,5-tetrabromo-;
1-isopropoxy-3,4-dibutyl-;
1-isopropoxy-3-(4-chloro-4-methylpentyl)-;
1-isopropoxy-2,3,5-triphenyl-;
1-isopropoxy-2-o-chlorophenyl-5-phenyl-;
1-isopropoxy-5-vinyl-;
1-isopropoxy-4-(4-methyl-3-pentenyl)-;
1-isopropoxy-5-phenoxy-;
1-isopropoxy-3-methoxy-; and
1-isopropoxy-2-hexyloxy-3-phospholene, respectively, and the corresponding 2-phospholene isomers, respectively.

Example 3

Preparation of 1 - methoxy-3-methyl-2-phospholene.—Following the procedure of Example 1 but replacing the 1-chloro-3-methyl-3-phospholene as used therein with an equal molar proportion of 1-chloro-3-methyl-2-phospholene, there is obtained 1-methoxy-3-methyl-2-phospholene in the form of a colorless liquid having a boiling point of 62° C./7.5 mm. of Hg.

The assigned structure of the product is confirmed by nuclear magnetic resonance analysis.

Similarly, following the above procedure but replacing the methanol as used therein with an equal molar proportion of methanethiol, n-hexanethiol, n-dodecanethiol, allylthiol, 1-dodecenethiol, benzenethiol, 2-naphthalenethiol, benzylthiol, 2-biphenylthiol and 3-chloropropanethiol respectively, there is obtained 1-methylthio-; 1-hexylthio-; 1-dodecylthio-; 1-allylthio-; 1-dodecenethio-; 1-phenylthio-; 1-(2-naphthalenethio)-; 1-benzylthio-; 1-(2-biphenylthio)-; and 1-(3 - chloropropylthio)-3-methyl-3-phospholene, respectively.

Example 4

Preparation of 1 - phenoxy-3-methyl-2-phospholene.— To a mixture of 1.7 gms. (0.126 moles) of 1-chloro-3-methyl-2-phospholene (Myers et al., supra) and 10 ml. of tetrahydrofuran there is added with stirring 1.46 grams. (0.126 moles) of sodium phenate in 10 ml. of tetrahydrofuran. After stirring for about 0.5 hours, the tetrahydrofuran is stripped from the reaction mixture and about 10 ml. of benzene added. The resulting mixture is filtered and the filtrate evaporated to remove benzene. The filtrate residue following evaporation of benzene is 1-phenoxy-3-methyl-2-phospholene in the form of a colorless liquid having a boiling point of 50° C./ 0.2 mm. of Hg. The assigned structure of the product is confirmed by nuclear magnetic resonance analysis.

Similarly, following the above procedure but substituting an equal molar proportion of each of the following compounds for the sodium phenate as used therein:

2-naphthol,
4-n-hexylphenol, and
o-chlorophenol, respectively, there are obtained 1-2′-naphthyloxy-;
1-(4-n-hexylphenoxy)-; and
1-o-chlorophenoxy-3-methyl-2-phospholene, respectively.

Example 5

Preparation of 1-(2 - chloroethoxy)-3-methyl-3-phospholene.—A reaction flask is charged with 123.8 gms. (0.92 moles) of 1-chloro-3-methyl-3-phospholene and 400 ml. of methylene chloride. The mixture is cooled in an ice bath, and the reaction vessel flushed with nitrogen gas. While maintaining the reaction mixture under a blanket of nitrogen gas and at a temperature of 5° C. to 15° C., 100 ml. of ethylene oxide (condensed by cooling to circa −70° C.) are added. The reaction mixture is stirred for about one-half hour at room temperature. Excess ethylene oxide and solvent is stripped from the reaction mixture and the residue distilled at a temperature of 99° C. to 103° C. under a pressure of 10 mm. of mercury to give 100.5 gms. (61.2% of theory) of 1-(2-chloroethoxy)-3-methyl-3-phospholene. The product is a colorless liquid having a boiling point of 97° C. to 102° C./ 10.0 mm. of Hg. The assigned structure of the product is confirmed by nuclear magnetic resonance analysis.

Similarly, following the above procedure but replacing the 1-chloro-3-methyl-3-phospholene as used therein with an equal molar proportion of each of the following halophospholenes:

1-chloro-;
1,3-dichloro-;
1-chloro-3,4-dibutyl-;
1-chloro-5-vinyl-;
1-chloro-5-phenoxy-; and
1-chloro-2-isohexyloxy-3-phospholene, respectively (all of which are prepared by the method of our copending application Ser. No. 148,997, filed June 1, 1971), there is obtained:

1-(2-chloroethoxy)-;
1-(2-chloroethoxy)-3-chloro;
1-(2-chloroethoxy)-3,4-dibutyl-;
1-(2-chloroethoxy)-5-vinyl-;
1-(2-chloroethoxy)-5-phenoxy-; and
1-(2-chloroethoxy)-2-isohexyloxy-3-phospholene, respectively.

Example 6

Preparation of 1 - (2-chloropropoxy)-3-methyl-3-phospholene and 1 - (2-chloro-1-methylethoxy)-3-methyl-3-phospholene.—A mixture of 152 ml. (130.5 gms.; 2.25 moles) of propylene oxide and 700 ml. of methylene chloride is cooled to a temperature circa 10° C. To the cooled mixture there is added with stirring 245.1 gms. (1.822 moles) of 1-chloro-3-methyl-3-phospholene at a rate such that the temperature of the reaction mixture is maintained between 10° C. to 15° C. Upon the completion of addition, the solvent is stripped from the reaction mixture. The residue is distilled at a temperature of 90° C. to 110° C. and under a pressure of 13 mm. of mercury to give 298.2 gms. (85 percent theory) of a distillate which is a mixture of 1-(2-chloropropoxy)-3-methyl-3-phospholene and 1 - (2-chloro-1-methylethoxy)-3-methyl-3-phospholene. The assigned structures of the product are confirmed by nuclear magnetic resonance analysis. The two isomers are separated by countercurrent extraction.

Similarly, following the above procedure but replacin the propylene oxide as used therein with an equal molar proportion of 1,2 - pentylene oxide; 1,2-octylene oxide, ethylene sulphide, 1,2-butylene sulphide and 1,2-octylene sulphide respectively, (the latter prepared by reaction of 1,2-octylene oxide with potassium thiocyanate, according to the method of Davies, et al., supra), there is obtained a mixture of 1-(2-chloropentyloxy)- and 1-(1-chloromethylbutyloxy)-3-methyl-3 - phospholene; a mixture of 1-(2-chlorooctyloxy)- and 1-(1-chloromethylheptyloxy)-3-methyl-3-phospholene; 1-(2 - chloroethanethio)-3-methyl-3-phospholene; a mixture of 1-(2-chlorobutylthio)- and 1-(1-chloromethylpropylthio) - 3 - methyl-3-phospholene; and a mixture of 1-(2-chlorooctylthio)- and 1-(1-chloromethylheptylthio)-3-methyl-3-phospholene, respectively. The isomers so obtained in admixture are separated by countercurrent extraction.

Example 7

Preparation of 1-hydro-3-methyl-3-phospholene-1-oxide.—A round bottom flask is flushed with nitrogen gas and charged with 11.8 gms. (0.0877 mole) of 1-chloro-3-methyl-3-phospholene (method of Myers et al., supra) in 75 ml. of benzene and a mixture of 15.8 gms. (0.0877 mole) of water and 13.9 ml. of (0.01 mole) of triethylamine, is added slowly with stirring. The resulting reaction is exothermic. The exotherm is controlled by adjusting the rate of water mixture addition and by cooling the reaction vessel, so that the reaction mixture is maintained at a temperature circa 25° C. to 30° C. Upon completion of water mixture addition, the reaction mixture is filtered under a nitrogen gas atmosphere to remove solids. The residue is washed with 50 ml. of benzene. The combined filtrate and washing is evaporated on a rotary evaporator to remove solvent and other volatiles. The residue is 1-hydro-3-methyl-3-phospholene-1-oxide in the form of a colorless liquid having a boiling point of 75° C. to 84° C./0.3 mm. of mercury. The structure of the product is confirmed by proton nuclear magnetic resonance analysis.

Similarly, following the above procedure but substituting for the 1-chloro-3-methyl-3-phospholene as used therein, an equal molar proportion of each of the following 1-halophospholenes:
1-chloro-;
1-chloro-2,3-dibromo-;
1-chloro-3-(4-chloro-4-methylpentyl)-;
1-chloro-5-vinyl-;
1-chloro-5-phenoxy-; and
1-chloro-3-butoxy-3-phospholene,
respectively (all of which can be prepared by reaction of the corresponding conjugated diene with phosphorus trichloride following the method of Preparation 1, followed by separation of the desired phospholene from the crude product mixture obtained, by distillation) there is obtained in each instance the corresponding 1-hydro-3-phospholene-1-oxide.

The 1-hydro-3-phospholene-1-oxides so obtained are useful catalysts in the preparation of carbodiimides from isocyanates.

Example 8

Preparation of 1-(diethanolaminomethyl)-3-methyl-3-phospholene-1-oxide.—A mixture of 78.3 gms. (0.746 mole) of diethanolamine and 22.4 gms. (0.746 mole) of paraformaldehyde is heated between about 50° C. to 60° C. To this mixture there is added dropwise with stirring 143.8 gm. (0.746 mole) of a mixture of 1-(2-chloropropoxy)-3-methyl-3-phospholene and 1-(2-chloro-1-methylethoxy)-3-methyl-3-phospholene (prepared according to Example 6). The addition is carried out over a period of about 45 minutes and the temperature of the reaction mixture is maintained between about 50° C. to 60° C. The mixture is stirred for about 30 minutes after addition is complete, and then volatiles are removed under a pressure of 15 mm. of mercury for 1 hour and then 0.3 mm. of mercury for four hours while maintaining the temperature of the reaction mixture at 60° C. The residue is then heated in an oil bath at 80° C. for two hours under a pressure of 0.3 mm. of Hg to give 176.0 gms. (101.2 percent of theory) of 1-(diethanolaminomethyl)-3-methyl-3-phospholene-1-oxide in the form of a yellow oil. The assigned structure of the product is confirmed by nuclear magnetic resonance analysis.

Similarly, repeating the above procedure but replacing the mixture of 1-(2-chloropropoxy)-3-methyl-3-phospholene and 1-(2-chloro-1-methylethoxy)-3-methyl-3-phospholene as used therein, with an equal molar proportion of each of the following 1-isopropoxyphospholenes prepared in accordance with Example 2:
1-isopropoxy-;
1-isopropoxy-3-chloro-;
1-isopropoxy-2,3,4,5-tetrabromo-;
1-isopropoxy-3,4-dibutyl-;
1-isopropoxy-3-(4-chloro-4-methylpentyl)-;
1-isopropoxy-2,3,5-triphenyl-;
1-isopropoxy-2-o-chlorophenyl-5-phenyl-;
1-isopropoxy-5-vinyl-;
1-isopropoxy-4-(4-methyl-3-pentenyl)-;
1-isopropoxy-5-phenoxy-;
1-isopropoxy-3-methoxy-; and
1-isopropoxy-2-isohexyloxy-3-phospholene,
respectively, and with 1-hydro-3-methyl-3-phospholene-1-oxide prepared according to Example 7, there are obtained:
1-diethanolaminomethyl-;
1-diethanolaminomethyl-3-chloro-;
1-diethanolaminomethyl-2,3,4,5-tetrabromo-;
1-diethanolaminomethyl-3,4-dibutyl-;
1-diethanolaminomethyl-3-(4-chloro-4-methylpentyl)-;
1-diethanolaminomethyl-2,3,5-triphenyl-;
1-diethanolaminomethyl-2-o-chlorophenyl-5-phenyl-;
1-diethanolaminomethyl-5-vinyl-;
1-diethanolaminomethyl-4-(4-methyl-3-pentenyl)-;
1-diethanolaminomethyl-5-phenoxy-;
1-diethanolaminomethyl-3-methoxy-; and
1-diethanolamino-2-isohexyloxy-3-phospholene-1-oxide
respectively, and 1-diethanolaminomethyl-3-methyl-3-phospholene-1-oxide, respectively.

Similarly, repeating the above procedure, but replacing the diethanolamine as used therein with an equal molar proportion of one of the following compounds of Formula III: ethanolamine, N-methylethanolamine, N-butylethanolamine, N-hexylethanolamine (all of which are prepared by reaction of the appropriate primary amine or ammonia with ethylene oxide, according to the method outlined in Rodd, supra, vol. 1, p. 690) dipropanolamine and hexanolamine, respectively, there are obtained:
1-(ethanolaminomethyl)-; 1-(N-methylethanolaminomethyl)-; 1-(N-butylethanolaminomethyl)-; 1-(N-hexylethanolaminomethyl)-; 1-(dipropanolaminomethyl)-; and 1-hexanolaminomethyl)-3-methyl-3-phospholene-1-oxide, respectively.

Similarly, repeating the above procedure, but replacing the paraformaldehyde as used therein with an equal proportion of each of the following compounds of Formula IV: acetaldehyde, n-heptaldehyde, acrolein, 2-heptenal, acetone, allyl vinyl ketone, acetophenone, benzophenone, cyclobutanone, 2-cyclobuten-1-one and 2-cyclohexene-1-one, respectively, there is obtained, 1-($\alpha$-methyl-diethanolaminomethyl)-;
1-($\alpha$-hexyl-diethanolaminomethyl-;
1-($\alpha$-vinyl-diethanolaminomethyl)-;
1-($\alpha$-2-hexenyl-diethanolaminomethyl)-;
1-($\alpha$-dimethyl-diethanolaminomethyl)-;
1 ($\alpha$-allyl-$\alpha$-vinyl-diethanolaminomethyl)-;
1-($\alpha$-methyl-$\alpha$-phenyl-diethanolaminomethyl)-;
1-($\alpha$-diphenyl-diethanolaminomethyl)-;
1-(1-diethanolaminocyclobutyl)-;
1-(1-diethanolaminocyclo-2-butenyl)-; and
1-(1-diethanolaminocyclo-2-hexenyl)-3-methyl-3-phospholene-1-oxide, respectively.

Example 9

Preparation of 1-(diethanolaminomethyl)-3-methyl-2-phospholene-1-oxide.—To a mixture of 20.6 gms. (0.153 mole) of 1-chloro-3-methyl-2-phospholene (method of Myers et al., supra) and 100 ml. of benzene (previously dried over Linde type 4A molecular sieves) there is added 32 ml. (0.23 mole) of triethylamine. The resulting mixture is cooled in an ice bath and 2.75 ml. (0.153 mole) of water added. The presence of 1-hydro-3-methyl-2-phospholene-1-oxide in the resulting mixture is confirmed by nuclear magnetic resonance analysis. The crude mixture so obtained is filtered, and the filtrate added to a mixture of 16.1 gms. (0.153 mole) of diethanolamine and 4.6 gms. (0.153 mole) of paraformaldehyde. The mixture is stirred for about 15 minutes and distilled at 70° C. under a pressure of 0.3 mm. of mercury to give 23.0 gms. (64.7 percent of theory) of a residue which is 1-(diethanolaminomethyl)-3-methyl-2-phospholene-1-oxide in the form of an orange gum.

*Analysis.*—Calc. for $C_{10}H_{20}O_3NP$ (percent): C, 51.5; H, 8.6; P, 13.2. Found (percent): C, 50.4; H, 8.3; P, 13.8.

The assigned structure of the product is confirmed by nuclear magnetic resonance analysis.

Example 10

Preparation of a crude mixture of 1-diethanolaminomethyl-3-methyl-3-phospholene-1-oxide.—The crude mixture containing 1-chloro-3-methyl-3-phospholene as obtained in Preparation 1 is cooled circa 10° C. With continuous stirring, 1670 gms. (1956 ml.; 28.8 moles) of propylene oxide is added to the crude residue mixture. The rate of addition is adjusted so that the resulting exotherm of the reaction mixture does not exceed about 10° C. Upon the completion of propylene oxide addition, the reaction mixture is heated to a temperature of between 30° C. to 35° C. and under a pressure of 70 mm. to 220 mm. of mercury to strip unreacted propylene oxide. The residue so obtained is added with continuous stirring to a mixture of 2100 gms. (20 moles) of diethanolamine and 631.5 gms. (20 moles) of 95 percent paraformaldehyde, which mixture was previously heated to a temperature circa 60° C. The addition is carried out over a period of about 1 hour, while maintaining the reaction mixture at a temperature between about 45° C. to 60° C. Upon the completion of addition, the reaction mixture is heated circa 55° C. to 60° C. for 1 hour. The reaction mixture is then cooled to ambient temperature and two volumes of acetone solvent added. The resulting mixture is filtered to remove solids and the filtrate stripped of solvent and other volatiles by heating between 39° C. to 110° C. under a pressure of between 0.7 mm. to 200 mm. of mercury, to give 4812.4 gms. of crude mixture which is about 80 percent by weight 1-diethanolaminomethyl-3-methyl-3-phospholene-1-oxide. The presence of the desired phospholene-1-oxide in the crude reaction product is confirmed by infra-red spectral analysis and nuclear magnetic resonance analysis.

The crude product so obtained has an average hydroxyl equivalent number of 125.6 and can be employed as a fire retardant polyol component to prepare polyurethane foams following any of the known methods (Saunders et al., supra).

Example 11

Preparation of 1-($\alpha$-phenyl-diethanolaminomethyl)-3-methyl-3-phospholene-1-oxide and 1-($\alpha$-phenyl-diethanolaminomethyl)-3-methyl-2-phospholene-1-oxide.—A mixture of 6.8 gms. (0.065 mole) of diethanolamine and 6.9 gms. (0.065 mole) of benzaldehyde is heated to about 60° C. To this mixture there is added dropwise with stirring 14.0 gms. (0.0727 mole) of a mixture of 1-(2-chloropropoxy) - 3 - methyl-3-phospholene, 1-(2-chloropropoxy)-3-methyl-2-phospholene, 1-(2-chloro-1-methylethoxy)-3-methyl-3-phospholene and 1 - (2-chloro-1-methylethoxy)-3-methyl-2-phospholene (prepared by reaction of a mixture of 1-chloro-3-methyl-3-phospholene and 1-chloro-3-methyl-2-phospholene with propylene oxide following the procedure of Example 6). The resulting reaction is exothermic. The addition is carried out at a rate such that the reaction mixture does not exceed a temperature of about 98° C. Upon completion of the addition, the reaction mixture is maintained at a temperature of about 60° C. to 70° C. for 30 minutes. Volatiles are then removed under a pressure of 0.5 mm. of mercury and at a temperature of 70° C. to 80° C. for about 30 minutes and then at a temperature of up to about 160° C., for about 5 minutes. The residue is 20.4 gms. (101 percent of theory) of a clear, colorless, glass like solid, which is a mixture of 1-($\alpha$-phenyl-diethanolaminomethyl)-3-methyl-3-phospholene-1-oxide and 1-($\alpha$-phenyl-diethanolaminomethyl) - 2 - phospholene-1-oxide. Identity of the product structures is confirmed by nuclear magnetic resonance analysis. The individual isomer components of the product mixture are separated by chromatographic separation technique.

Example 12

Preparation of 1-($\alpha$ - ethyl - diethanolaminomethyl)-3-methyl-3-phospholene-1-oxide and 1-($\alpha$-ethyl-diethanolaminomethyl)-3-methyl-2-phospholene-1-oxide.—A mixture of 6.3 gms. (0.06 mole) of diethanolamine and 3.48 gms. (0.06 mole) of propionaldehyde is prepared. Upon admixture there is an exothermic reaction giving a temperature rise circa 55° C. To this 55° C. mixture there is added with stirring 13.3 gms. (0.068 mole) of a mixture of 1-(2-chloropropoxy)-3-methyl-3-phospholene, 1-(2-chloropropxy)-3-methyl-2-phospholene, 1-(2-chloro-1-methylethoxy)-3-methyl-3-phospholene and 1-(2-chloro-1-methylethoxy)-3-methyl-2-phospholene (prepared from reaction of a mixture of 1-chloro-3-methyl-3-phospholene and 1-chloro-3-methyl-2-phospholene with propylene oxide according to the procedure of Example 6). The resulting reaction is exothermic and the rate of addition is controlled so that the reaction mixture is maintained at a temperature of 60° C. to 70° C. for about 30 minutes. Volatiles are then removed from the reaction mixture by heating circa 70° C. to 80° C. under a pressure of about 0.5 mm. of mercury for about 30 minutes and then at a temperature up to about 140° C. for about 5 minutes. The residue is 16.7 gms. of a mixture of 1-($\alpha$-ethyl-diethanolaminomethyl)-3-methyl - 3 - phospholene-1-oxide and 1 - ($\alpha$-ethyl-diethanolaminomethyl)-3-methyl-2-phospholene-1-oxide in the form of a clear colorless liquid. Identity of the product structure is confirmed by nuclear magnetic resonance analysis. The individual isomer components of the product mixture are separated by chromatographic separation technique.

Example 13

Preparation of 1-(1-diethanolaminocyclohexyl)-3-methyl-3-phospholene-1-oxide and 1-(1-diethanolaminocyclohexyl)-3-methyl-2-phospholene-1-oxide. — A mixture of 7.9 gms. (0.075 mole) of diethanolamine and 7.4 gms. (0.075 mole) of cyclohexanone is heated to 60° C. To this mixture there is added with stirring 15.7 gms. (0.0815 mole) of a mixture of 1-(2-chloropropxy)-3-methyl-3-phospholene, 1-(2 - chloropropoxy)-3-methyl-2-phospholene, 1 - (2-chloro-1-methylethoxy)-3-methyl-3-phospholene and 1 - (2-chloro-1-methylethoxy)-3-methyl-2-phospholene (prepared by reaction of a mixture of 1-chloro-3-methyl-3-phospholene and 1-chloro-3-methyl - 2 - phospholene with propylene oxide following the procedure of Example 6). The resulting reaction mixture is heated to circa 98° C., whereupon an exothermic reaction occurs and the reaction mixture warms to a temperature of circa 145° C. The reaction mixture is thereafter cooled to a temperature of 100° C. to 110° C. and maintained at this temperature for about 15 minutes. The reaction mixture is then allowed to cool to room temperature, whereupon there is obtained a white solid material. The white solid is triturated in dry diethyl ether and filtered. The filtrate is evaporated to remove volatiles by heating to 50° C. under a pressure of from 15 mm. to 0.5 mm. of mercury. The residue is then heated to 100° C. under a pressure of 0.5 mm. of mercury for 5 minutes. The remaining residue is then allowed to cool to room temperature to give 18.9 gms. (83.6 percent of theory) of a mixture of 1-(1-diethanolaminocyclohexyl)-3-methyl-3-phospholene-1-oxide and 1-(1 - diethanolaminocyclohexyl)-3-methyl-2-phospholene-1-oxide in the form a reddish brown solid.

The product structures are confirmed by nuclear magnetic resonance analysis. The individual isomer components of the product mixture are separated by chromatographic separation techniques.

We claim:
1. A compound of the formula:

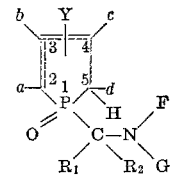

wherein $a$, $c$ and $d$ are each hydrogen; $b$ is methyl; F is selected from the group consisting of hydrogen and hydroxyalkyl of 2 to 3 carbon atoms inclusive; G is hydroxyalkyl of 2 to 6 carbon atoms inclusive; $R_1$ and $R_2$, when taken individually, are each selected from the group consisting of hydrogen and alkyl of 1 to 6 carbon atoms inclusive; $R_1$ and $R_2$, when taken together with the carbon atom to which they are attached, represent a cyclohexylene moiety; the broken line indicates a double bond located between the carbon atom at position 3 and one of the two carbon atoms at positions 2 and 4; Y is hydrogen attached to whichever carbon atom at positions 2 and 4 is not part of said double bond.

2. A compound according to claim 1 and which is 1-diethanolaminomethyl-3-methyl-3-phospholene-1-oxide.

3. A compound according to claim 1 and which is 1-diethanolaminomethyl-3-methyl-2-phospholene-1-oxide.

4. A compound according to claim 1 and which is 1-($\alpha$-ethyl-diethanolaminomethyl)-3-methyl-3-phospholene-1-oxide.

5. A compound according to claim 1 and which is 1-($\alpha$-ethyl-diethanolaminomethyl)-3-methyl-2-phospholene-1-oxide.

6. A compound according to claim 1 and which is 1-(1 - diethanolaminocyclohexyl)-3-methyl-3-phospholene-1-oxide.

7. A compound according to claim 1 and which is 1-(1 - diethanolaminocyclohexyl)-3-methyl-2-phospholene-1-oxide.

References Cited
FOREIGN PATENTS
1,011,974   4/1963   Great Britain _____ 260—563 R ELBERT L. ROBERTS, Primary Examiner D. R. PHILLIPS, Assistant Examiner U.S. Cl. X.R.

252—426; 260—570.9, 606.5 P, 936, 945